July 4, 1967

F. R. SIBBALD 3,329,171

PLURAL VALVE ASSEMBLY WITH SELECTIVE MOTION ACTUATION

Filed June 5, 1964

July 4, 1967    F. R. SIBBALD    3,329,171
PLURAL VALVE ASSEMBLY WITH SELECTIVE MOTION ACTUATION
Filed June 5, 1964    2 Sheets-Sheet 2

United States Patent Office 3,329,171
Patented July 4, 1967

3,329,171
PLURAL VALVE ASSEMBLY WITH SELECTIVE MOTION ACTUATION
Frederick R. Sibbald, Southall, England, assignor to The Hoover Company, North Canton, Ohio, a corporation of Ohio
Filed June 5, 1964, Ser. No. 372,744
Claims priority, application Great Britain, June 19, 1963, 24,424/63
3 Claims. (Cl. 137—636.1)

This application relates to a pump and valve assembly.

The pump and valve assembly of the present invention is distinguished by its simplicity both in operation and ease of assembly or disassembly.

The preferred embodiment of the invention is especially well suited for use in clothes washing machines of the so-called "twin-tub" type wherein two independent tubs are mounted side-by-side in a cabinet. One of the tubs is used for washing, and the other tub comprises a centrifugal extractor for rinsing and damp drying the clothes.

In the preferred embodiment there is provided a pump base, a pump housing and a valve housing. These three units are assembled by releasably connecting them together into a very compact unit.

The valve housing is provided with a pair of water inlets and a pair of valves for the inlets. The valves are selectively operable to open either one of the valves while the other valve remains closed.

Therefore, it is an object of this invention to provide an improved pump and valve assembly which is very economical to produce due to the simplicity and ease of assembly of the units, and is easily disassembled for service or repair.

Another object of this invention is to provide an improved valve housing and valve assembly wherein a pair of valves are selectively operable by a single control to selectively drain water from two independent tubs.

Other objects and advantages of the present invention will be readily apparent to those skilled in the art from the detailed description which follows.

Figure 2:
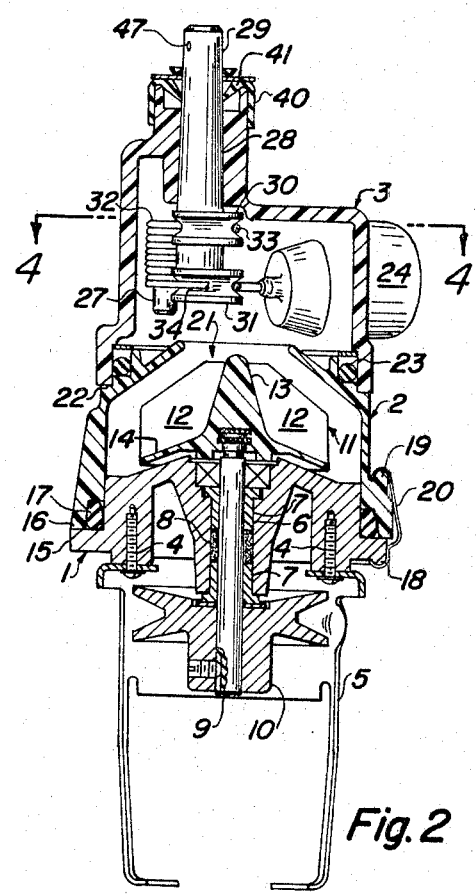
FIG. 2 is a sectional elevation of the assembly of FIG. 1.

As shown in FIG. 2 there is provided a pump base 1; a pump housing 2; and a valve housing 3.

Pump base 1 is provided with bores in its bottom periphery for receiving screws 4 which secure a support 5 to the pump base. Support 5 is used to mount the pump and valve assembly on the frame of a washing machine cabinet.

Pump base 1 has a central aperture 6 formed therein for receiving bearings 7 and packing 8.

Shaft 9 is rotatably mounted in bearings 7 and has a pulley 10 keyed to its lower end, and an impeller 11 secured to its upper end. Pulley 10 is adapted to be driven by a belt from an electric motor.

Impeller 11 has four vanes 12, hub 13 and back plate 14. Impeller 11 is preferably formed of resilient nylon. The resiliency of the vanes 12 and back plate 14 prevent solid objects such as buttons and pins from jamming the pump.

Pump base 1 has an outwardly extending peripheral flange 15 against which the bottom edge 16 of pump housing 2 abuts.

The inner periphery of bottom edge 16 of pump housing 2 is notchted to receive an O-ring 17 for sealing the joint between the pump base and pump housing. The notch is sloped as shown so as to cam tightly against the O-ring when the parts are assembled.

Pump base flange 15 and pump housing 2 are provided with circumferentially spaced projections 18 and 19 over which spring clips 20 are snapped to hold the pump base and pump housing together.

Pump housing 2 has a restricted opening 21 at its upper end to form an inlet eye for the pump.

The upper outer periphery of pump housing 2 is stepped to provide a shoulder 22 upon which valve housing 3 is supported, and a recess for O-ring 23.

Valve housing 3 has inlets 24 and 25 which are adapted to be connected to a washing tub and a centrifugal extractor tub.

Pump housing 2 is provided with an outlet 26.

Valve housing 3 has a torsion spring supporting rod 27 projecting downwardly from its inside top portion.

Valve housing 3 is also bored at 28 and control shaft 29 is rotatably mounted in the bore.

The lower portion of shaft 29 is provided with cams 30 and 31.

Torsion spring 32 is mounted on rod 27. One end portion 33 of spring 32 extends outwardly past cam 30 and is then bent at substantially a right angle. The other end portion 34 of spring 32 extends outwardly past cam 31 and is then bent at substantially a right angle.

The ends of end portions 33 and 34 have valves 35 and 36 secured thereto. Valves 35 and 36 are preferably molded of rubber and have metal reinforcing discs 37 therein.

Torsion spring 32 normally urges end portions 33 and 34 toward one another in a horizontal direction so that valves 35 and 36 close inlets 25 and 24.

Cams 30 and 31 are peripherally grooved as shown in FIGS. 2 and 4–7. End portions 33 and 34 of torsion spring 32 ride in the grooves to hold the torsion spring in a stable vertical position.

Cams 30 and 31 are preferably offset on shaft 29 so that the axis of rotation of the cams is adjacent one end of the cams rather than at the center thereof.

Figure 5:
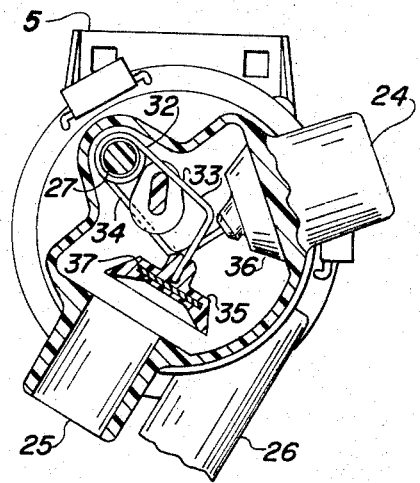

When shaft 29 is rotated counterclockwise cam 30 opens valve 35 as shown in FIG. 5. Due to the offset axis of rotation cam 31 will not move end portion 34 of the torsion spring and valve 36 remains closed.

Figure 6:
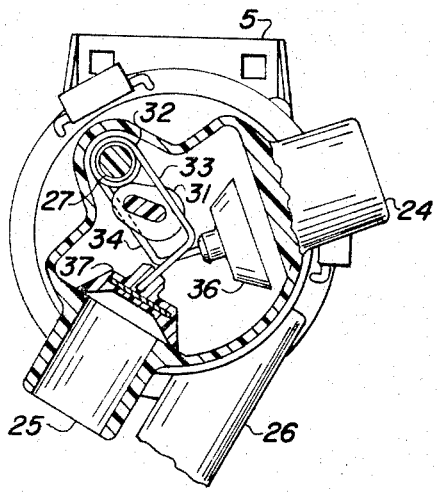

Rotation of shaft 29 clockwise causes cam 31 to open valve 36 and valve 35 remains closed as shown in FIG. 6.

Figure 7:
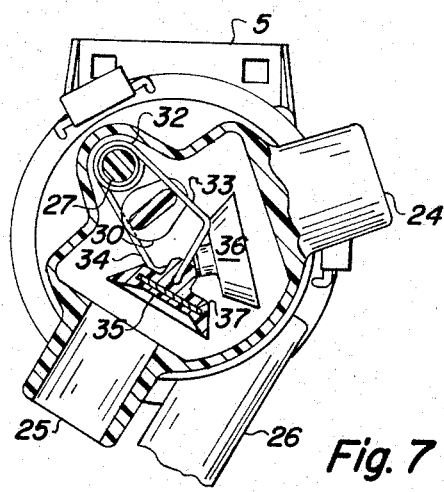
FIG. 7 is a sectional plan view showing another embodiment of the valve control.

FIGURE 7 shows an embodiment wherein the cams rotate about a central axis. Movement of the cams to either of the positions of FIGS. 5 and 6 will selectively open valves 35 and 36 one at a time. Movement of the cams to an intermediate position as shown in FIG. 7 opens both valves simultaneously.

Figure 8:
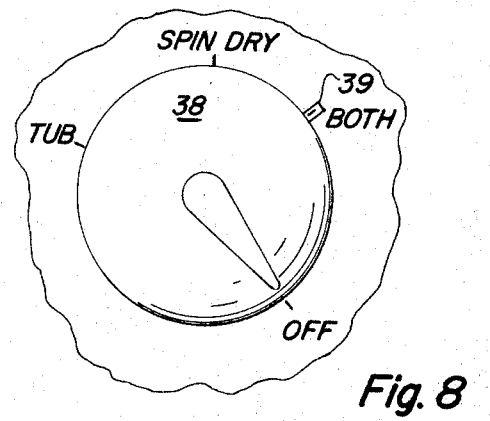
FIG. 8 is a plan view of a dial for use on the control of FIG. 7.

Control knob 38 in FIG. 8 is axially slidable and a notch in the underside of the knob is engageable with a projection 39 on the cabinet to hold the cam in the intermediate postion of FIGURE 7.

Rubber seal 40 is provided to prevent leakage from valve housing 3 along shaft 29. The seal has an inwardly projecting portion 41 in engagement with shaft 29.

Figure 3:
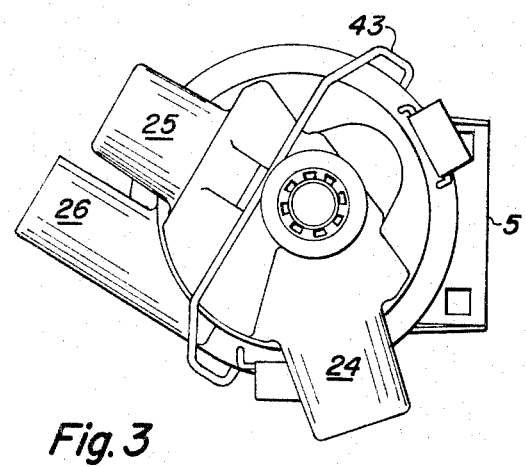
FIG. 3 is a plan view of the assembly of FIG. 1.
Figure 1:
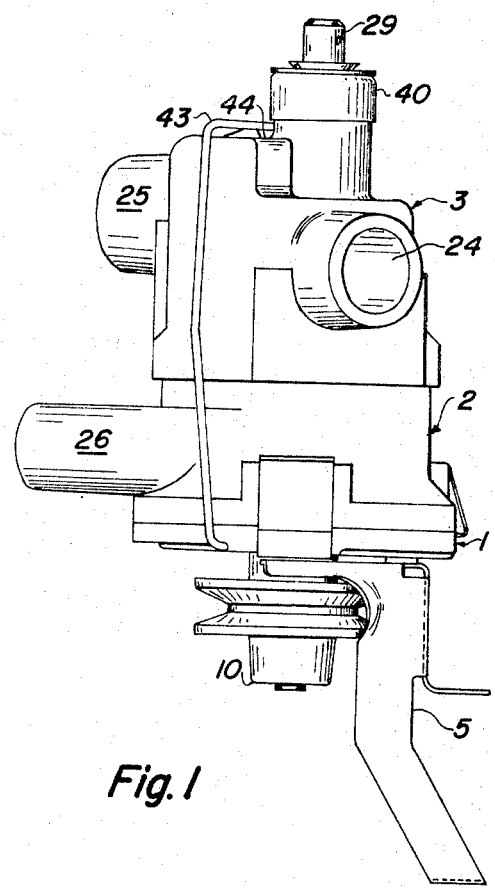
FIG. 1 is a side elevation of a combined pump and valve assembly.

Spring loop 43 secures the valve housing to the pump housing as shown in FIGS. 1 and 3. Inturned ends on the spring loop project beneath the pump base 1 and the top of the spring loop snaps in a recess 44 at the top of the valve housing.

O-ring 23 is held in a compressed state between vertical walls formed on pump housing 2 and valve housing 3. A split ring is positioned above O-ring 23 as shown in FIGURE 2 and has its upper outer edge abutting a shoulder on valve housing 3. The split ring prevents O-ring 23 from working its way out of a water sealing position between pump housing 2 and valve housing 3.

Figure 4:
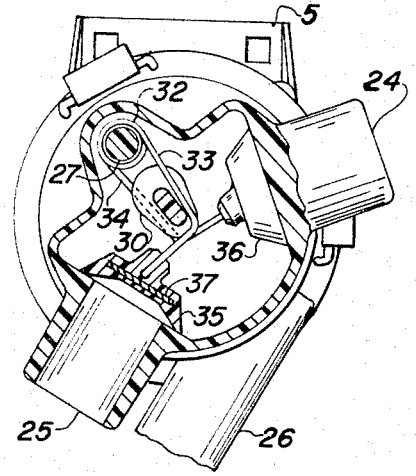
FIGS. 4–6 are sectional plan views taken on the line 4—4 of FIG. 2.

It will be noted that when cam 30 of FIGURE 4 is rotated to the position as shown in FIGURE 5, rod 27 acts as a stop for placing the cam in a proper rotated position to open valve 35. Once the valve is open rod 27 and end portion 33 of spring 32 cooperate to hold the cam against accidental rotation in either direction. Rotating the cam of FIGURE 4 to an intermediate position such as shown in FIGURE 7 might cause accidental closing of the valve due to the force of the spring end portions against a sloping surface on the cam. Opening one valve as 35 in FIGURE 5 places an additional torsional force on spring 32 and serves to securely seat the other valve 36.

Pump housing 2 and valve housing 3 are easily separated by forcing the end portions of spring loop 43 in FIGURE 1 away from one another to release the inturned ends from beneath pump base 1.

An advantageous feature of the present pump and valve assembly is that it can be easily disassembled without the necessity of removing the entire unit from its mounting position, and without the necessity of disconnecting the drive belt or hoses.

Shaft 29 is rotated by a rod having a bent end (not shown) received in an opening 47 in a manner well known to those skilled in the art.

In centrifugal pumps it sometimes happens that a foreign object such as a piece of cloth or a pin becomes lodged beneath the impeller. These are usually difficult to remove because the pump base has integral sidewalls projecting above and surrounding the impeller. It will be noted in FIGURE 2 that the pump base of the present invention has no sidewalls projecting up above the bottom of the impeller. Thus, when pump housing 2 is removed any foreign objects lodged beneath the impeller are easily removed.

To service the pump and valve assembly when it is installed one merely has to remove spring loop 43 and lift the valve housing free. There is no need to uncouple the hoses unless valve housing 3 must be taken to a shop for repair. Pump housing 2 is lifted free to expose the impeller merely by releasing spring clips 20. A simple tool, such as a screwdriver for prying off the spring clips, would be the only thing necessary to disassemble the pump.

If any of the working parts, such as the impeller or halves, are permanently damaged they can easily be removed and replaced without the necessity of removing the entire assembly from its mounting.

Pump base 1 is preferably made of aluminum while pump housing 2 and valve housing 3 are made of any suitable thermosetting resin. It is understood that the materials are not important and any suitable types could be used.

Valve control shaft 29, and cams 30 and 31 are preferably molded integrally of Delrin.

It will be apparent to those skilled in the art that a pump and valve assembly has been provided which is very simple in construction and operation, and is easily assembled or disassembled. The new pump and valve assembly has the advantage of performing all the functions of much more expensive and complicated units.

It is to be understood that the single embodiment of the present invention shown and described herein is only illustrative, and is not to be taken in a limiting sense.

The present invention includes all equivalent variations of the embodiment disclosed and is limited only by the scope of the claims.

I claim:
1. A valve assembly comprising;
    (a) a housing having first and second openings therein,
    (b) first and second valve members independently movably mounted for selective independent movement between first positions in which said openings are closed by said valve members and second positions in which said openings are not closed by said valve members,
    (c) a single spring having first and second arms,
    (d) said first arm biasing said first valve member toward one of said first and second positions,
    (e) said second arm biasing said second valve member toward one of said first and second positions,
    (f) a rotary member rotatably mounted and extending between said first and second arms,
    (g) said rotary member having first and second cam means thereon,
    (h) said first and second cam means being selectively engageable with said first and second arms respectively to selectively move said first and second valve members from said one position to the other of said first and second positions against the bias of said spring arms upon rotation of said rotary member.

2. The valve assembly of claim 1 wherein said first and second valve members are each biased to said first position, said first cam means being selectively engageble with said first arm in one direction of rotation of said rotary member to move said first valve member to said second position, and said second cam means being selectively engageable with said second arm in the other direction of rotation of said rotary member and to move said second valve member to said second position.

3. The valve assembly of claim 2 wherein said spring comprises a coil spring having a coil portion and said first and second arms extend substantially tangentially from said coil portion in substantially the same direction and substantially parallel to one another, said housing having a projection thereon received in said coil portion, said first arm having a free end portion bent toward said second arm and said second arm having a free end portion bent toward said first arm, said first valve member being mounted on said free end portion of said first arm and said second valve member being mounted on said free end portion of said second arm.

References Cited
UNITED STATES PATENTS

| | | | |
|---|---|---|---|
| 1,345,772 | 6/1920 | Hibner | 137—636.1 |
| 2,093,003 | 9/1937 | Bowman | 103—2 |
| 2,415,466 | 2/1947 | Curtis | 137—607 |
| 2,462,372 | 2/1949 | Erickson | 103—150 |
| 2,544,597 | 2/1951 | Irti | 137—607 |
| 2,590,674 | 3/1952 | Bodey | 137—628 X |
| 2,669,932 | 2/1954 | Rauscher | 103—2 |
| 2,719,531 | 10/1955 | Sogge | 137—636.4 X |
| 2,861,591 | 11/1958 | Hertel | 137—607 |
| 3,002,531 | 10/1961 | Katva | 137—607 |
| 3,125,959 | 3/1964 | Stoddard | 103—2 |
| 3,160,106 | 12/1964 | Ashworth | 103—103 |
| 3,211,013 | 10/1965 | Quesinberry | 137—637.1 X |

CLARENCE R. GORDON, *Primary Examiner.*